Patented Mar. 13, 1934

1,950,820

UNITED STATES PATENT OFFICE 1,950,820

COATING MATERIALS

Arthur Schmidt, Stade in Hanover, and Max Deseniss, Hamburg, Germany, assignors, by mesne assignments, to Deutsche Tornesit-Gesellschaft m. b. H., Hamburg, Germany, a corporation No Drawing. Application April 14, 1931, Serial No. 530,130. In Germany June 26, 1930

1 Claim. (Cl. 134—54)

This invention relates to a process for increasing the resistance to shocks and blows of coatings which have been prepared from or mixed with solutions of chlorinated rubber in a volatile solvent. Although not only pigments but also filling materials and mineral substances have long been added to varnishes of all kinds, it has not previously been appreciated that the resistance to blows and resistances to cracking, of thick coatings in particular, is increased by the addition of specially hard substances with a particular size of granule.

According to this invention, for producing a highly resistant coating, a hard substance, for instance carborundum, quartz-meal or the like, with a grain size of 40–100µ is incorporated.

A varnish consisting, for example, of chlorinated rubber and benzene gives, on application upon smooth surfaces, transparent coatings which are very beautiful in themselves but which tend to flake off, film being formed; this tendency is the more marked, the smoother the surface. Such coatings become fully resistant to shock, when hard substances such as quartz-meal, carborundum and the like of grain size 40–100µ are added thereto in accordance with the invention. The coatings produced with these mixtures are characterized by extraordinarily secure attachment and do not flake or split off even when struck or dropped.

Having now particularly described and ascertained the nature of our said invention, and in what manner the same is to be performed we declare that what we claim is:

A varnish adapted to provide a hard, adherent, shock resistant, ornamental and protective coating to a surface to which it may be applied, comprising a mixture of a solution of chlorinated rubber in a volatile solvent, and pulverized carborundum having a grain size of 40–100µ.

ARTHUR SCHMIDT.
MAX DESENISS.